Patented Aug. 12, 1952

2,606,909

UNITED STATES PATENT OFFICE 2,606,909

BASIC DIOXOLANES

Frederick F. Blicke, Ann Arbor, Mich., assignor to Regents of The University of Michigan, Ann Arbor, Mich., a corporation of Michigan No Drawing. Application August 1, 1947, Serial No. 765,623

5 Claims. (Cl. 260—338)

This invention relates to new compositions of matter having valuable therapeutic properties, and more specifically, to new substituted basic dioxolanes.

The chemical structure of the new compounds is characteristically that of 1-3-dioxolane with one or more cyclic structures substituted at the 2-position and a substituted amino methyl residue at the 4-position as depicted in the structural formula:

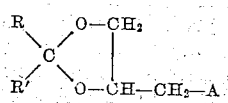

in which the group RR'C may be regarded as the residue of a chain ketone having one or more ring structures in the chain, or a cyclic ketone residue; and in which A represents a secondary or tertiary amino group linked through its nitrogen. Hence RR'C may be the residue of an aromatic ketone, or a mixed aromatic ketone having an aromatic group or a grouping of similar structural character attached to one side of the C-atom and an aliphatic, alicyclic or heterocyclic group attached to the other side. Moreover, the ketone residue, RR'C, may constitute a single carbocycle or heterocycle, or a bridged hydrocarbon or heterocyclic configuration with C forming the common member of a spiro ring system. The amino group, A, is the residue of an aliphatic or alicyclic primary or secondary amine where the hydrocarbon substituent or substituents are of relatively low molecular weight, or of a cyclic imine. In the last category are comprehended polymethylenimines where the imino nitrogen is a ring member of a heterocycle possessing the character of a secondary amine; e. g., pyrrolidine, pyrazolidine, pyrroline, piperidine. The cyclic imine may contain hetero members other than nitrogen as in, for example, morpholine.

The new compounds possess useful properties as histamine antagonists and antispasmodics, combining a high degree of effectiveness with low toxicity. Many are high boiling liquids. As bases they form acid addition salts; e. g. with hydrochloric, sulfuric, succinic and malic acids. Likewise, the new substituted dioxolane bases form quaternary ammonium compounds, e. g., methiodide, ethobromide, and benzylbromide quaternary salts by alkyl or aralkyl halide addition. The acid addition salts and the quaternary ammonium salts, in general, are relatively soluble, crystalline solids and are valuable for the purposes of this invention. The new compounds may be used in the form of water or oil solutions or as the salts or quaternary ammonium compounds.

In general the new compounds are prepared in a 2-step process. First, epibromohydrin is condensed with an appropriate ketone to give the desired 2,2-configuration and produce a 2,2-disubstituted-4-bromomethyl-1,3-dioxolane, as follows:

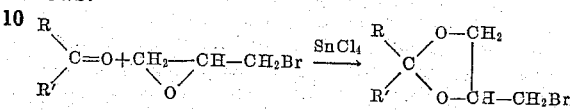

The reaction is carried out in an inert solvent such as carbon tetrachloride in the presence of a condensing agent such as anhydrous stannic chloride. After a reaction period of several hours, during which the reaction temperature is controlled, the mixture may be decomposed by the addition of an excess of alkali. The carbon tetrachloride layer is separated, filtered and evaporated to a small volume. The desired dioxolane crystallizes on cooling, and may be washed with isopropyl alcohol. The product may be recrystallized from isopropyl alcohol or used directly in the subsequent reaction without further purification.

In the second step the disubstituted bromomethyldioxolane is aminated by the reaction of the dioxolane with the appropriate amine in a closed vessel at temperatures of 50 to 100° C. A solvent such as benzol, ether or alcohol may be used if desired. Chloromethyldioxolanes may be used but are less satisfactory because of their greater resistance to amination. One to seven days are ordinarily required for completion of the reaction. The mixture is then decomposed by the addition of an excess of alkali and the dioxolane is separated and distilled. The purified dioxolane base may be converted to acid addition salts or quaternary salts by the usual methods.

The ketone starting materials for producing the compounds of this invention are characteristically cyclic in structure with the carbonyl group either forming a part of the ring structure or having one or more rings directly attached to form a ring-membered chain. Various sub-classes of the new substituted basic dioxolanes are defined according to the shape, structural configuration, molecular size and weight, and the relative aromaticity or aliphatic character of the ketone starting materials. Among the available aromatic ketones are diaryl ketones, in which benzene or naphthalene rings are directly attached to the carbonyl group, such as benzophenone and equivalent substituted diphenyl ketones, where the substituents are of a non-toxic character. Mixed aliphatic-aromatic ketones provide another group of aromatic ketone starting materials. The aliphatic group may be straight or branched chain in structure, including, for example, methyl, ethyl, propyl, isopropyl, butyldiethylcarbinyl and ethylbutylcarbinyl. Mixed aromaticalicyclic ketones, e. g., where one group is phenyl or substituted phenyl and the other group is cyclohexyl or other cycloalkylene radical, are suitable. Mixed ketones of the aryl-heterocyclic type may also be utilized with advantage. Available heterocycles include, for example, thiophene, pyridine, piperidine and the pyrimidines, with the keto linkage ordinarily positioned alpha to the key hetero atom. Those mixed ketones having a conjugated or aromatic-type heterocycle attached to one side of the carbonyl group and an aliphatic chain or ring attached to the other side may be considered as useful equivalents for the mixed aromatic ketones.

The keto or carbonyl group may form part of a ring structure so that the epibromohydrin condensation reaction will produce a spiran, or dioxolane of multiple ring structure, linked at the 2-position. For this purpose, ketones of single, fused, or bridged carbocyclic and heterocyclic structure are suitable. The cycloalkylene and bicycloalkylene ketones such as cyclopentanone and cyclohexanone as well as the cyclic terpenes and camphors are exemplary of substances included in this category. Multiple ring or spiro dioxolanes of advantage may also be produced from ketones or bridged aryl structures, i. e., where the 2 aryl groups of an aromatic ketone are themselves bridged or linked directly or by bridging atoms or groups such as —NH—, —NR—, —O—, —S—, —CH₂—, for example. Among the bridged aryl ketones which are useful are: xanthone, fluorenone, thioxanthone, N-methyl acridone.

The amines available for the production of the new compounds are essentially primary and secondary amines which are introduced in the amination step into the dioxolane structure at the 4-methyl position to provide a secondary or tertiary amino methyl grouping. Included are aliphatic, primary and secondary amines where the aliphatic substituent groups are alkyl or cycloalkyl groups of relatively low molecular weight. In the case of the secondary amines, the substituent groups may be the same or different, and in either case the alkyl groups may be straight or branched chain residues. In addition to the aliphatic and alicyclic amines, the cyclic imines or polymethylenimines form a valuable group of starting materials for the amination step. These compounds may contain other nitrogen or other hetero atoms in the ring in addition to the nitrogen of the imino group, and may be of the single ring or fused ring type. The heterocyclic structure, however, is united to the 4-methyl dioxolane through a ring-membered, imino nitrogen atom.

The preparation of the new class of compounds will be illustrated by the following specific example but the invention is not limited thereto. The other members of the class may be prepared through analogous procedure by substituting the appropriate materials and by adjusting the reaction ratios, and the reaction and environmental conditions as is known to the art.

*2,2-diphenyl-4-diethylaminomethyl-1,3-dioxolane*

2,2 - diphenyl -4- bromomethyl -1,3- dioxolane is prepared by dissolving 51 gm. of benzophenone and 45 gm. of epibromohydrin in 100 cc. of carbon tetrachloride, cooled to 10° C., and stirred during the dropwise addition of 10 gm. of anhydrous stannic chloride in 100 cc. of carbon tetrachloride. This addition is carried out over a 3½ hour period and stirring continued for ½ hour thereafter. The reaction temperature is maintained at about 10° C. during the addition. The reaction mixture is decomposed by adding in one portion a cold solution of 16 gm. of sodium hydroxide in 100 cc. of water. The carbon tetrachloride layer is separated, filtered, and evaporated on a steam bath. The residue is cooled and the resulting crystalline material washed with cool isopropyl alcohol to give 59 gm. of product, melting point: 70.5–72.5° C.

This intermediate product is aminated by allowing 40 gm. of the 2,2-diphenyl-4-bromomethyl-1,3-dioxolane to react with 45–46 gm. of diethyl amine in a pressure bottle heated at 90–100° C. About 26 hours are required for completion of the reaction. The mixture is then mixed with a solution of 10 gm. of sodium hydroxide in 50 cc. of water and the product extracted with ether. The ether extract is dried over solid potassium hydroxide and distilled to give 35 gm. of product, boiling point: 129–132° C. at 0.01 mm., $n_D^{20}$: 1.543. Similarly, amination of 2,2-diphenyl-4-bromomethyl-1,3-dioxolane with dimethyl amine yields 2,2-diphenyl-4-dimethylaminomethyl-1,3-dioxolane; B. P.: 121–123° C. at 0.01 mm., and $n_D^{20}$: 1.553.

This base may be converted to the hydrochloride salt by dissolving it in five to ten volumes of methyl ethyl ketone, adding an equivalent amount of alcoholic hydrogen chloride, and chilling. The precipitated hydrochloride is washed with ether to remove traces of acid and when recrystallized from ethyl acetate has a melting point of 118–120° C. It is readily soluble in 3 parts of water. The hydrochloride of the above-mentioned 2,2-diphenyl-4-dimethylaminomethyl-1,3-dioxolane (M. P.: 189°–191° C.) is prepared in analogous fashion. Other hydrochlorides similarly prepared are those of 2,2-diphenyl-4-(1-piperidyl) methyl-1,3-dioxolane; M. P.: 202°–204° C. uncorrected; 2,2-diphenyl-4-isopropylaminomethyl-1,3-dioxolane; M. P.: 195–197° C. uncorrected, solubility: 1:5; and 2,2-diphenyl-4-(morpholyl) methyl-1,3-dioxolane; M. P. 192–193° C. uncorrected; solubility: 1:5.

The methiodide may be prepared by allowing the base to react with a slight excess of methyl iodide and crystallizing the product from methyl ethyl ketone. The methiodides of 2,2-diphenyl-4 - dimethylaminomethyl - 1,3 - dioxolane (M. P.: 193–195° C.) and of 2,2-diphenyl-4-(1-piperidyl)-methyl-1,3-dioxolane (M. P.: 157–159° C. uncorrected) are illustrative of the products prepared in this manner.

Other 2,2-disubstituted 4-aminomethyl-1,3-dioxolanes which exemplify the compounds of this invention are:

2,2-diphenyl-4-dimethylaminomethyl-1,3 - dioxolane 2,2-diphenyl-4-(1-piperidyl-methyl-1,3-dioxolane 2-phenyl-2-thienyl-4-diethylaminomethyl-1,3-dioxolane 2-phenyl-2-pyridyl-4-diethylaminomethyl-1,3-dioxolane 2,2-diphenylene-4-diethylaminomethyl-1,3-dioxolane
2-phenyl-2-cyclohexyl-4-diethylaminomethyl-1,3-dioxolane
2-phenyl-2-isopropyl-4-diethylaminomethyl-1,3-dioxolane
2-phenyl-2-diethylcarbinyl-4-diethylaminomethyl-1,3-dioxolane
2-phenyl-2-ethylbutylcarbinyl-4-diethylaminomethyl-1,3-dioxolane
Spiro[4-diethylaminomethyl-1,3-dioxolane-2,9'-xanthene]
Spiro[4-diethylaminomethyl-1,3-dioxolane-2,9'-thiaxanthene]
Spiro[4-diethylaminomethyl-1,3-dioxolane-2,9'-thiaxanthene-10'-dioxide]
Spiro[4-diethylaminomethyl-1,3-dioxolane-2,9'-acridan]
Spiro[4-diethylaminomethyl-1,3-dioxolane-2,2'-bicyclo(3.1.0)-1'-methyl-4'-isopropyl-hexane]
Spiro[4-diethylaminomethyl-1,3-dioxolane-2,9'-(N-methyl)acridan]
Spiro[4-diethylaminomethyl-1,3-dioxolane-2,9'-dihydroanthracene]
2,2-diphenyl-4-isopropylaminomethyl-1,3-dioxolane
2-phenyl-2-thienyl-4-isopropylaminomethyl-1,3-dioxolane
2,2-diphenyl-4-cyclohexylaminomethyl-1,3-dioxolane
2,2-diphenyl-4(morpholyl)methyl-1,3-dioxolane
2-phenyl-2-pyridyl-4(morpholyl)methyl-1,3-dioxolane
Spiro[4-(morpholyl)methyl-1,3-dioxolane-2,9'-thiaxanthene]
2,2-diphenyl-4-(1-pyrrolidyl)methyl-1,3-dioxolane
2,2-diphenylene-4-isopropylaminomethyl-1,3-dioxolane

I claim:
1. Basic dioxolanes represented by the structural formula

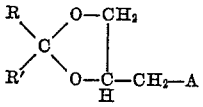

in which R is a phenyl radical and R' is a radical selected from the group consisting of cyclohexyl, phenyl, thienyl, and pyridyl radicals and in which R and R' taken together are a diphenylene radical and in which A is a radical selected from the group consisting of primary and secondary lower alkyl amino radicals, primary and secondary cyclohexylamino radicals, mixed lower alkyl-cyclohexyl secondary amino radicals and cyclic imino radicals selected from the group consisting of pyrrolidyl, pyrrazolidyl, pyrrolyl, piperidyl and morpholyl.

2. Basic dioxolanes as in claim 1 in which A is a lower alkyl secondary amino group.

3. 2,2-diphenyl-4-diethylaminomethyl-1,3-dioxolane.

4. Basic dioxolanes represented by the structural formula

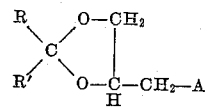

in which R and R' represent phenyl groups and in which A is a radical selected from the group consisting of primary and secondary lower alkyl amino radicals, primary and secondary cyclohexylamino radicals, mixed lower alkyl-cyclohexyl secondary amino radicals and cyclic imino radicals selected from the group consisting of pyrrolidyl, pyrrazolidyl, pyrrolyl, piperidyl and morpholyl.

5. 2,2-diphenyl-4-dimethylaminomethyl-1,3-dioxolane.

FREDERICK F. BLICKE.

REFERENCES CITED

The following references are of record in the file of this patent:

UNITED STATES PATENTS

| Number | Name | Date |
|---|---|---|
| 2,445,393 | Fourneau | July 20, 1948 |

OTHER REFERENCES

Willfang, Berichte der Deut. Chem. Gesell, 74 (1941), pp. 145 and 146.

Fourneau et al., Bulletin de la Societe Chimique de France, Memoirs, 1945, pages 850–851.